(12) United States Patent
DeLand et al.

(10) Patent No.: US 9,555,480 B2
(45) Date of Patent: Jan. 31, 2017

(54) FLUID-FED VACUUM CUTTERS

(71) Applicant: THE BOEING COMPANY, Chicago, IL (US)

(72) Inventors: James Albert DeLand, Seattle, WA (US); Matthew Gregory Kesterson, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 428 days.

(21) Appl. No.: 13/970,305

(22) Filed: Aug. 19, 2013

(65) Prior Publication Data

US 2015/0050093 A1 Feb. 19, 2015

(51) Int. Cl.
| | | |
|---|---|---|
| B23B 27/10 | (2006.01) | |
| B23B 35/00 | (2006.01) | |
| B23Q 11/00 | (2006.01) | |
| B23B 51/06 | (2006.01) | |
| B23D 77/00 | (2006.01) | |

(52) U.S. Cl.
CPC ............ B23B 35/00 (2013.01); B23B 51/06 (2013.01); B23D 77/006 (2013.01); B23Q 11/006 (2013.01); B23B 2215/04 (2013.01); B23B 2251/68 (2013.01); Y02P 70/171 (2015.11); Y10T 408/03 (2015.01); Y10T 408/23 (2015.01); Y10T 408/45 (2015.01)

(58) Field of Classification Search
CPC .. B23B 2215/04; B23B 2238/36; B23B 41/16; B23B 41/00; B23B 2226/27; B23B 37/00; B23B 2286/36; B23B 2228/36; Y10T 408/23; Y10T 408/1954; Y10T 408/45; Y10T 408/44
See application file for complete search history.

(56) References Cited

U.S. PATENT DOCUMENTS

| | | | |
|---|---|---|---|
| 800,894 A | * 10/1905 | Baldwin | ............ B23B 51/0486 408/118 |
| 3,032,129 A | 5/1962 | Fletcher et al. | |
| 3,144,912 A | 8/1964 | Boehm et al. | |

(Continued)

FOREIGN PATENT DOCUMENTS

| | | |
|---|---|---|
| CN | 1903849 A * | 7/2007 |
| DE | 3817799 C1 * | 11/1989 |

(Continued)

OTHER PUBLICATIONS

Machine translations of Chinese patent CN1903849A to Want et al. Jul. 2007.*

(Continued)

*Primary Examiner* — Daniel Howell
*Assistant Examiner* — Chwen-Wei Su
(74) *Attorney, Agent, or Firm* — Vista IP Law Group LLP; Cynthia A. Dixon

(57) ABSTRACT

In one aspect of the disclosure, a system for processing a location of a workpiece is disclosed. The system includes a tool, including a first passage, configured to supply a vacuum to the location, and a second passage formed along the first passage, where the second passage is configured to supply a fluid to the location. The system also includes means for rotating and selectively axially vibrating the tool, means for supplying the fluid to the tool, and means for supplying the vacuum to the tool.

20 Claims, 10 Drawing Sheets

(56) References Cited

U.S. PATENT DOCUMENTS

| | | | | |
|---|---|---|---|---|
| 3,619,671 | A | * | 11/1971 | Shoh .................. B06B 1/06 310/325 |
| 3,893,355 | A | * | 7/1975 | Maastricht ......... B23Q 1/0036 279/20 |
| 4,688,970 | A | * | 8/1987 | Eckman ............ G05B 19/4163 408/10 |
| 4,798,505 | A | * | 1/1989 | Ameseder ................ B05B 1/06 175/208 |
| 5,092,716 | A | * | 3/1992 | Omi .................... B23D 59/025 408/204 |
| 6,050,756 | A | * | 4/2000 | Buchholz ............... B24B 41/04 137/896 |
| 6,086,292 | A | | 7/2000 | Yokoyama |
| 6,948,890 | B2 | * | 9/2005 | Svensson ........... B23B 51/0486 408/56 |
| 7,563,060 | B2 | | 7/2009 | Kesterson et al. |
| 8,360,698 | B2 | * | 1/2013 | Hasebe ................ B23C 5/1009 408/61 |
| 2008/0041604 | A1 | * | 2/2008 | Sauer ..................... B23B 31/02 173/217 |
| 2013/0189043 | A1 | * | 7/2013 | Uchiuzo ............ G05B 19/4163 408/1 R |
| 2014/0119845 | A1 | * | 5/2014 | Kakimoto ........... B23Q 11/006 408/58 |
| 2014/0356087 | A1 | * | 12/2014 | Best ....................... B23B 51/06 408/1 BD |

FOREIGN PATENT DOCUMENTS

| | | | |
|---|---|---|---|
| EP | 1506070 | A1 | 2/2005 |
| EP | 1627703 | A1 | 2/2006 |
| EP | 2559508 | A1 | 2/2013 |
| JP | 60259303 | A * | 12/1985 |
| JP | 2002283176 | A * | 10/2002 |
| JP | 2015-37830 | A | 2/2015 |
| SU | 1184617 | A * | 10/1985 |

OTHER PUBLICATIONS

Machine translations of Japan patent JP 2002283176A to Hiroyuki et al., Oct. 2002.*

Machine translation, German patetnt publication, DE3817799, "Rotary transmission leadthrough for fluids, in particular for machine-tool spindles", Effenberger, Wolfgang, Nov. 30, 1989.*

Extended European Search Report, Patent Application No. 14180797.4-1702, Dec. 18, 2014.

Laporte, et al., "Major Breakthrough in Multi Material Drilling, Using Low Frequency Axial Vibration Assistance", SAE Intl. J. Mater. Manf., vol. 6, Issue 1, Sep. 10, 2012.

"Metalworking Products, Deep Hole Drilling", Product Catalog and Application Guide, Sandvik, downloaded on Aug. 17, 2013, from http://www.sandvik.coromant.com/sitecollectiondocuments/downloads/global/catalogues/en-us/c-1202-1.pdf.

* cited by examiner

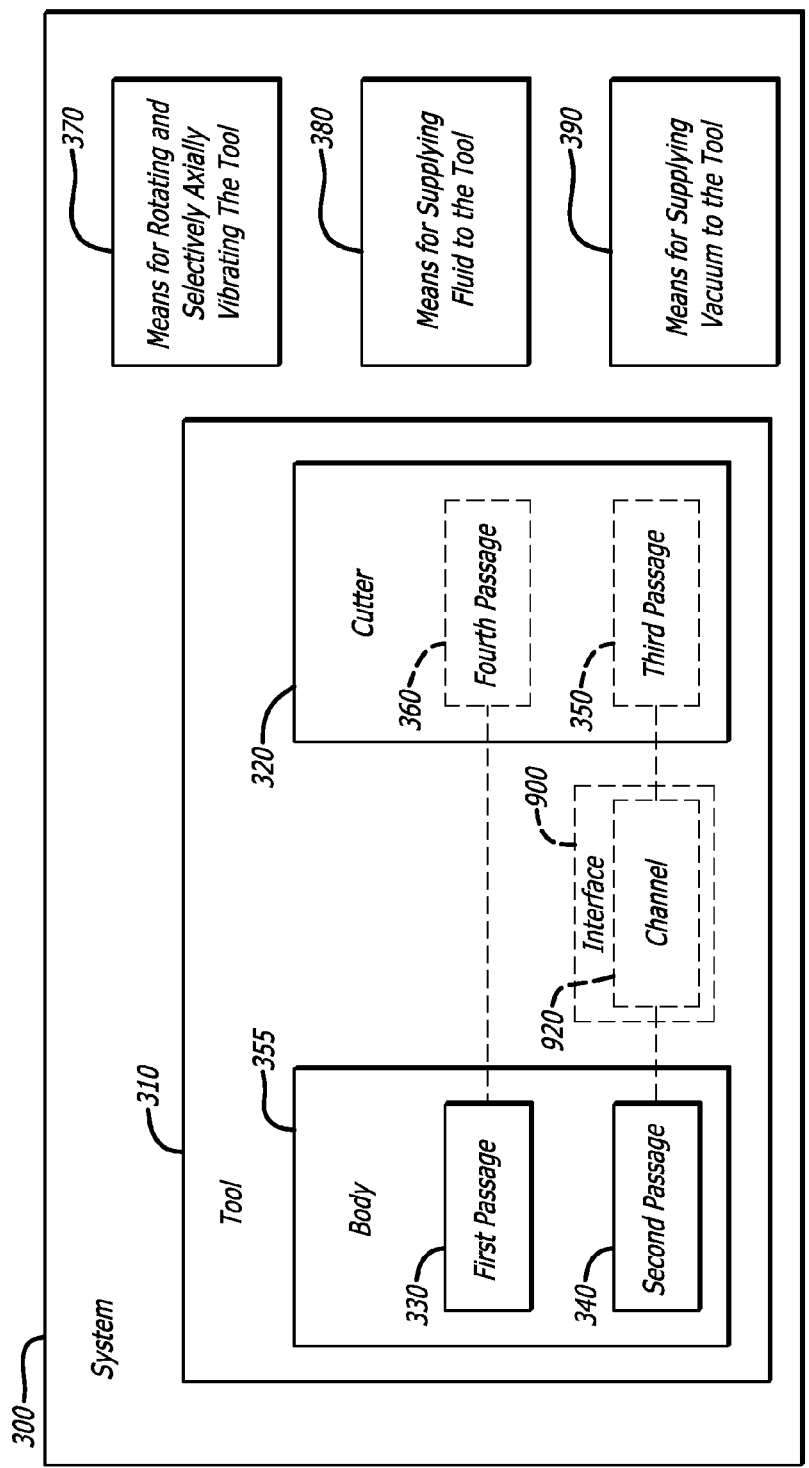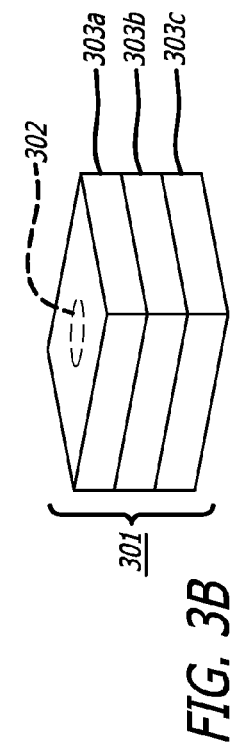
FIG. 3A
FIG. 3B

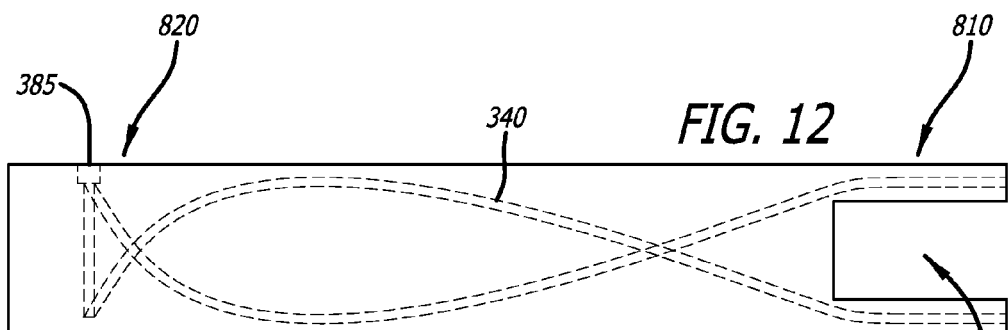
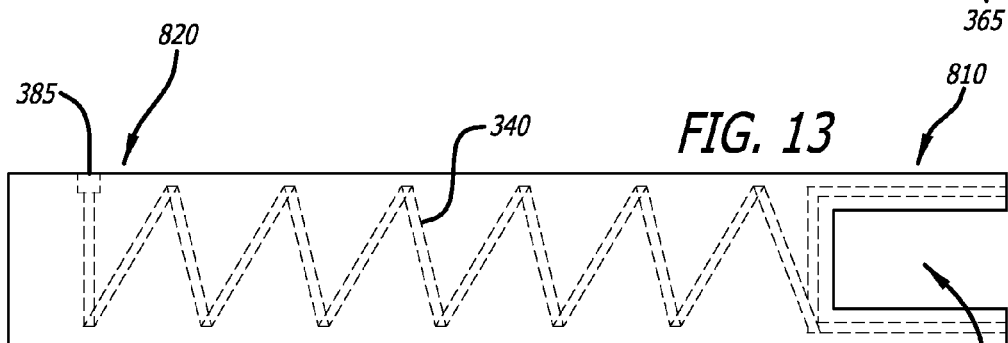
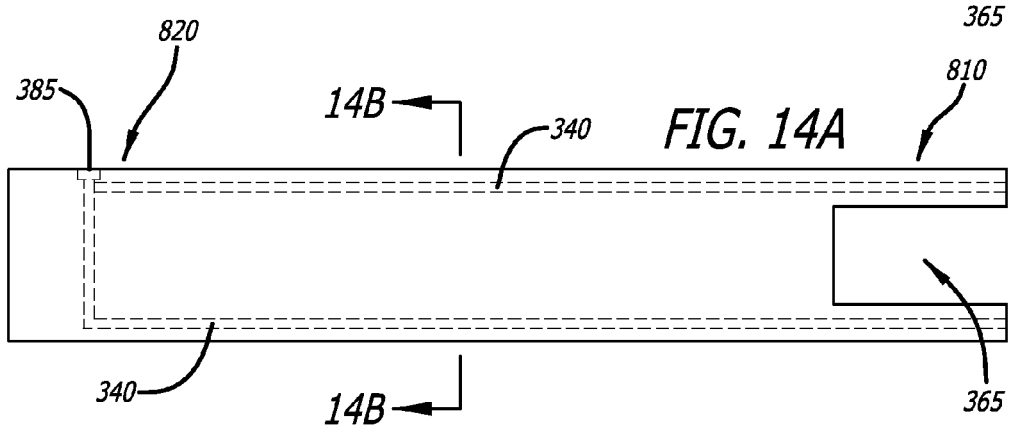
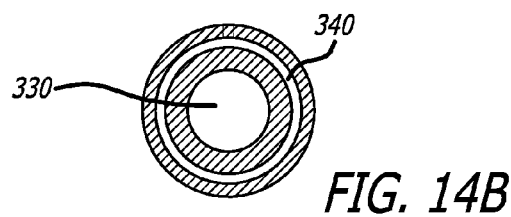

FLUID-FED VACUUM CUTTERS

BACKGROUND OF THE INVENTION

Currently, external vacuum sources are commonly used to remove foreign-object debris (FOD), such as dust and chips, resulting from drilling operations. When processing parts that include metallic materials, fluid is typically supplied in large amounts at the processing location for lubricating and/or cooling purposes. As such, the existing drilling methods require extensive cleanup, which increases manufacturing cost and lead times.

SUMMARY

Accordingly, fluid-fed vacuum cutters may find utility.

One example of the present disclosure relates to a system for processing a location of a workpiece. The system includes a tool, including a first passage, configured to supply a vacuum to the location, and a second passage formed along the first passage, where the second passage is configured to supply a fluid to the location. The system further includes means for rotating and selectively axially vibrating the tool, means for supplying the fluid to the tool, and means for supplying the vacuum to the tool.

One example of the present disclosure relates to a tool for processing a location of a workpiece. The tool includes a first passage, configured to supply a vacuum to the location, and a second passage, configured to supply a fluid to the location. The second passage is formed along the first passage.

In one aspect of the tool, which may include at least a portion of the subject matter of any of the preceding and/or following examples and aspects, the first passage has a first diameter, the second passage has a second diameter, and a ratio of the second diameter to the first diameter is between about 0.03 and about 0.09.

In one aspect, which may include at least a portion of the subject matter of any of the preceding and/or following examples and aspects, the tool also includes a cutter.

In one aspect of the tool, which may include at least a portion of the subject matter of any of the preceding and/or following examples and aspects, the cutter is removable from the tool.

In one aspect of the tool, which may include at least a portion of the subject matter of any of the preceding and/or following examples and aspects, the cutter includes a third passage in communication with the second passage.

In one aspect of the tool, which may include at least a portion of the subject matter of any of the preceding and/or following examples and aspects, the cutter includes a fourth passage in communication with the first passage.

In one aspect, which may include at least a portion of the subject matter of any of the preceding and/or following examples and aspects, the tool also includes a body comprising a proximal portion and a distal portion opposite the proximal portion.

In one aspect of the tool, which may include at least a portion of the subject matter of any of the preceding and/or following examples and aspects, the first passage and the second passage are formed within the body.

In one aspect of the tool, which may include at least a portion of the subject matter of any of the preceding and/or following examples and aspects, the first passage and the second passage extend between the proximal portion and the distal portion.

In one aspect of the tool, which may include at least a portion of the subject matter of any of the preceding and/or following examples and aspects, the body includes at least one inlet in the distal portion. The inlet(s) is in communication with the first passage.

In one aspect of the tool, which may include at least a portion of the subject matter of any of the preceding and/or following examples and aspects, the inlet(s) is laterally oriented in the body.

In one aspect of the tool, which may include at least a portion of the subject matter of any of the preceding and/or following examples and aspects, the inlet(s) is axially oriented in the body.

In one aspect of the tool, which may include at least a portion of the subject matter of any of the preceding and/or following examples and aspects, the body includes at least one entry port.

In one aspect of the tool, which may include at least a portion of the subject matter of any of the preceding and/or following examples and aspects, the entry port(s) is in the proximal portion. The entry port(s) is in communication with the second passage.

In one aspect, which may include at least a portion of the subject matter of any of the preceding and/or following examples and aspects, the tool also includes an adapter coupled to the proximal portion of the body.

In one aspect, which may include at least a portion of the subject matter of any of the preceding and/or following examples and aspects, the tool also includes an interface coupled to the distal portion of the body.

In one aspect, which may include at least a portion of the subject matter of any of the preceding and/or following examples and aspects, the tool also includes a channel in communication with the second passage.

In one aspect, which may include at least a portion of the subject matter of any of the preceding and/or following examples and aspects, the tool also includes a cutter removably coupled to the interface.

In one aspect of the tool, which may include at least a portion of the subject matter of any of the preceding and/or following examples and aspects, the cutter comprises a third passage in communication with a channel in the interface.

In one aspect of the tool, which may include at least a portion of the subject matter of any of the preceding and/or following examples and aspects, the channel is in communication with the second passage.

In one aspect of the tool, which may include at least a portion of the subject matter of any of the preceding and/or following examples and aspects, the second passage is straight.

In one aspect of the tool, which may include at least a portion of the subject matter of any of the preceding and/or following examples and aspects, the second passage is curved.

In one aspect of the tool, which may include at least a portion of the subject matter of any of the preceding and/or following examples and aspects, the second passage is generally spiral.

In one aspect of the tool, which may include at least a portion of the subject matter of any of the preceding and/or following examples and aspects, at least a portion of the second passage is annular.

One example of the present disclosure relates to a method for manufacturing a tool for processing a location of a workpiece. The method includes extruding a body comprising a proximal portion and a distal portion opposite the proximal portion, extruding a first passage within the body, and extruding a second passage within the body, where the second passage is formed along the first passage.

In one aspect, which may include at least a portion of the subject matter of any of the preceding and/or following examples and aspects, the method also includes brazing an adaptor to the proximal portion of the body.

In one aspect, which may include at least a portion of the subject matter of any of the preceding and/or following examples and aspects, the method also includes brazing an interface to the distal portion of the body.

One example of the present disclosure relates to a method of processing a location of a workpiece. The method includes advancing a tool into the workpiece while rotating and selectively axially vibrating the tool, selectively supplying a fluid through the tool to the location, and evacuating, through the tool, processing debris and the fluid from the location.

In one aspect of the method, which may include at least a portion of the subject matter of any of the preceding and/or following examples and aspects, evacuating the processing debris includes supplying a vacuum through the tool to the location.

In one aspect of the method, which may include at least a portion of the subject matter of any of the preceding and/or following examples and aspects, the fluid is supplied through the tool to the location under a pressure.

In one aspect, which may include at least a portion of the subject matter of any of the preceding and/or following examples and aspects, the method also includes advancing the tool into a layer of the workpiece, where the layer is made of a non-metallic material.

In one aspect, which may include at least a portion of the subject matter of any of the preceding and/or following examples and aspects, the method also includes avoiding supplying the fluid to the location.

In one aspect, which may include at least a portion of the subject matter of any of the preceding and/or following examples and aspects, the method also includes avoiding axially vibrating the tool.

One example of the present disclosure relates to a method of processing a location of a workpiece, where the workpiece includes a layer R and a layer $\Omega$. The method includes advancing a tool into the layer R at a first feed rate while rotating the tool at a first rotational speed and selectively axially vibrating the tool at a first frequency and a first amplitude, advancing the tool into the layer $\Omega$ at a second feed rate while rotating the tool at a second rotational speed and selectively axially vibrating the tool at a second frequency and a second amplitude, selectively supplying a fluid through the tool to the location, and evacuating, through the tool, processing debris and the fluid from the location.

In one aspect of the method, which may include at least a portion of the subject matter of any of the preceding and/or following examples and aspects, the layer R is made of a non-metallic material and the layer $\Omega$ is made of a metallic material.

In one aspect of the method, which may include at least a portion of the subject matter of any of the preceding and/or following examples and aspects, advancing the tool into the layer R further includes avoiding supplying the fluid to the location.

In one aspect of the method, which may include at least a portion of the subject matter of any of the preceding and/or following examples and aspects, the first rotational speed is greater than the second rotational speed.

In one aspect of the method, which may include at least a portion of the subject matter of any of the preceding and/or following examples and aspects, advancing the tool into the layer R further includes avoiding axially vibrating the tool.

In one aspect of the method, which may include at least a portion of the subject matter of any of the preceding and/or following examples and aspects, the first rotational speed is equal to the second rotational speed.

In one aspect of the method, which may include at least a portion of the subject matter of any of the preceding and/or following examples and aspects, the first rotational speed is greater than the second rotational speed.

In one aspect of the method, which may include at least a portion of the subject matter of any of the preceding and/or following examples and aspects, the first rotational speed is less than the second rotational speed.

In one aspect of the method, which may include at least a portion of the subject matter of any of the preceding and/or following examples and aspects, the first frequency is equal to the second frequency.

In one aspect of the method, which may include at least a portion of the subject matter of any of the preceding and/or following examples and aspects, the first frequency is greater than the second frequency.

In one aspect of the method, which may include at least a portion of the subject matter of any of the preceding and/or following examples and aspects, the first frequency is less than the second frequency.

In one aspect of the method, which may include at least a portion of the subject matter of any of the preceding and/or following examples and aspects, the first feed rate is equal to the second feed rate.

In one aspect of the method, which may include at least a portion of the subject matter of any of the preceding and/or following examples and aspects, the first feed rate is greater than the second feed rate.

In one aspect of the method, which may include at least a portion of the subject matter of any of the preceding and/or following examples and aspects, the first feed rate is less than the second feed rate.

In one aspect of the method, which may include at least a portion of the subject matter of any of the preceding and/or following examples and aspects, the first amplitude is equal to the second amplitude.

In one aspect of the method, which may include at least a portion of the subject matter of any of the preceding and/or following examples and aspects, the first amplitude is greater than the second amplitude.

In one aspect of the method, which may include at least a portion of the subject matter of any of the preceding and/or following examples and aspects, the first amplitude is less than the second amplitude.

BRIEF DESCRIPTION OF THE DRAWINGS

Figure 1:
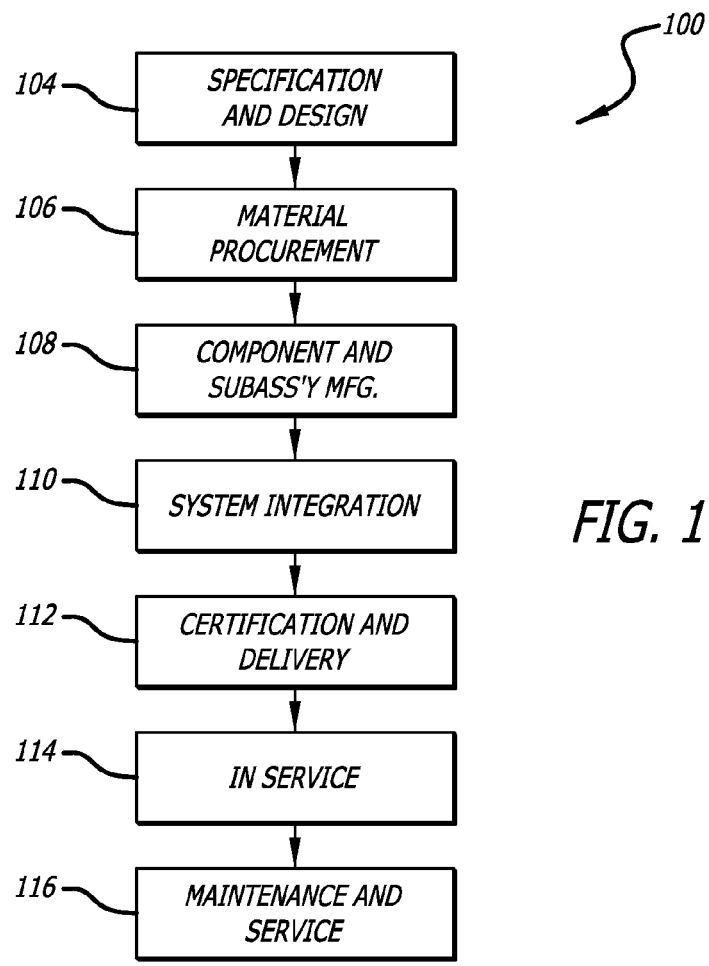
Figure 2:
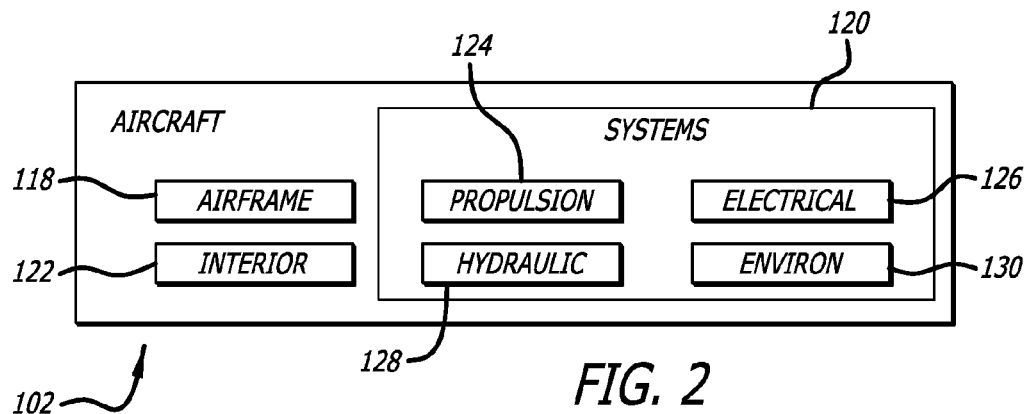
Figure 4:
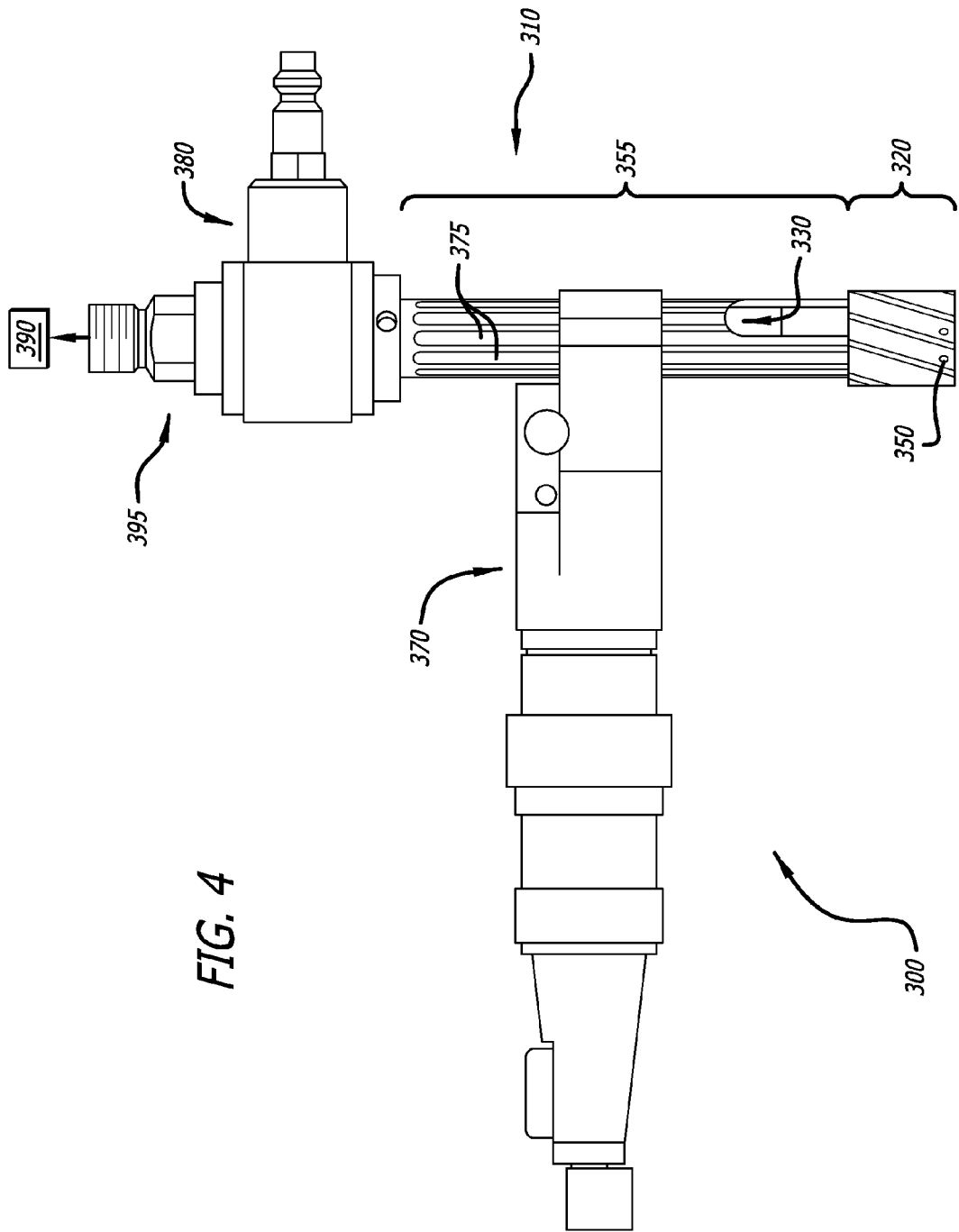
Figure 5:
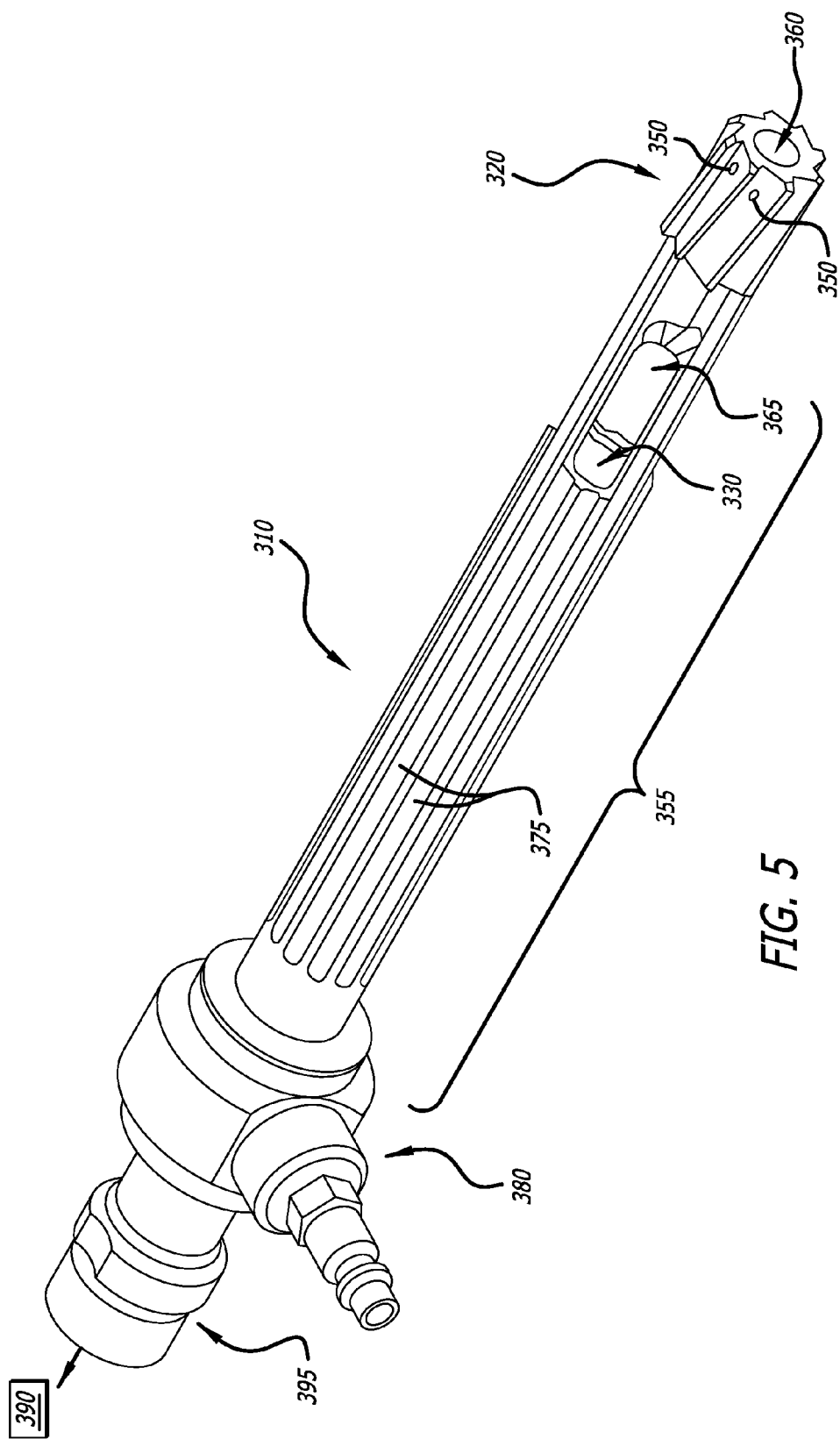
Figure 6:
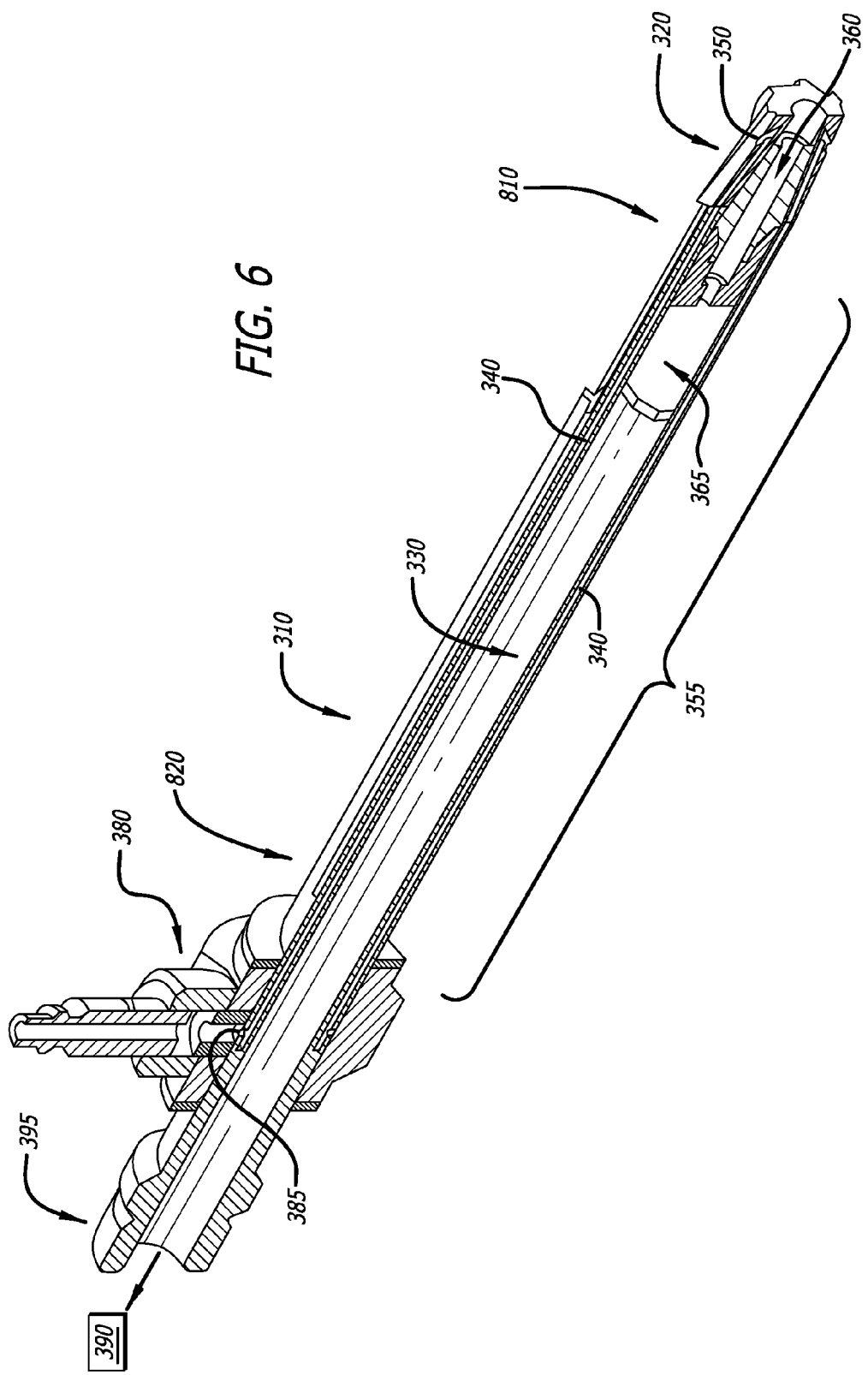
Figure 7:
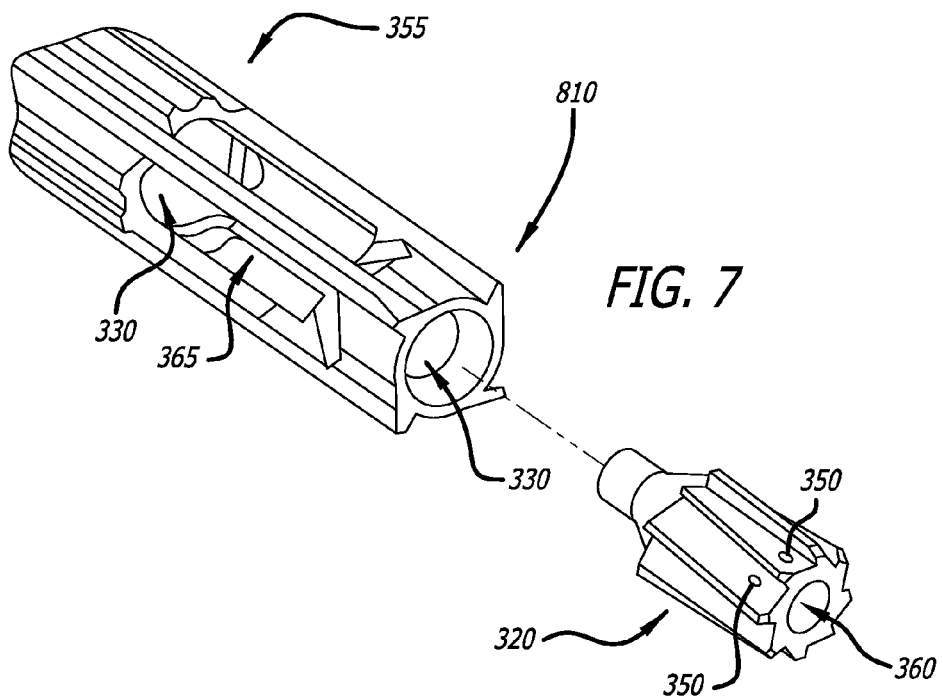
Figure 8:
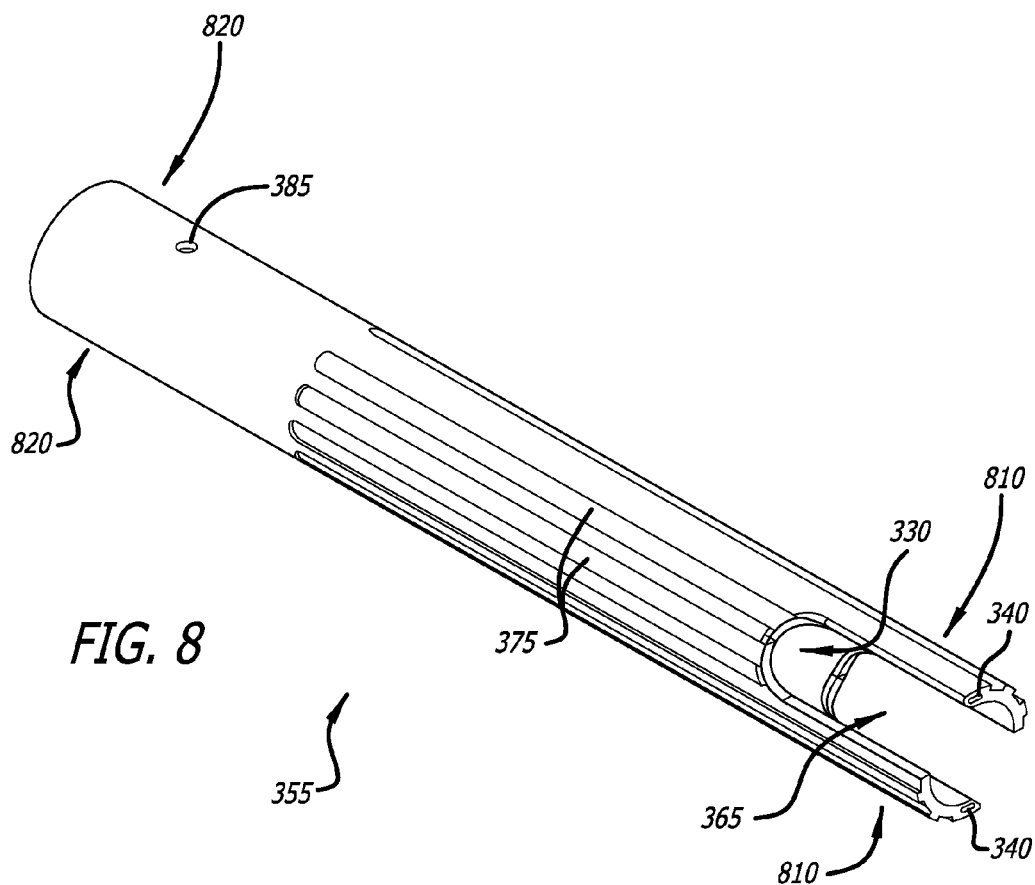
Figure 9:
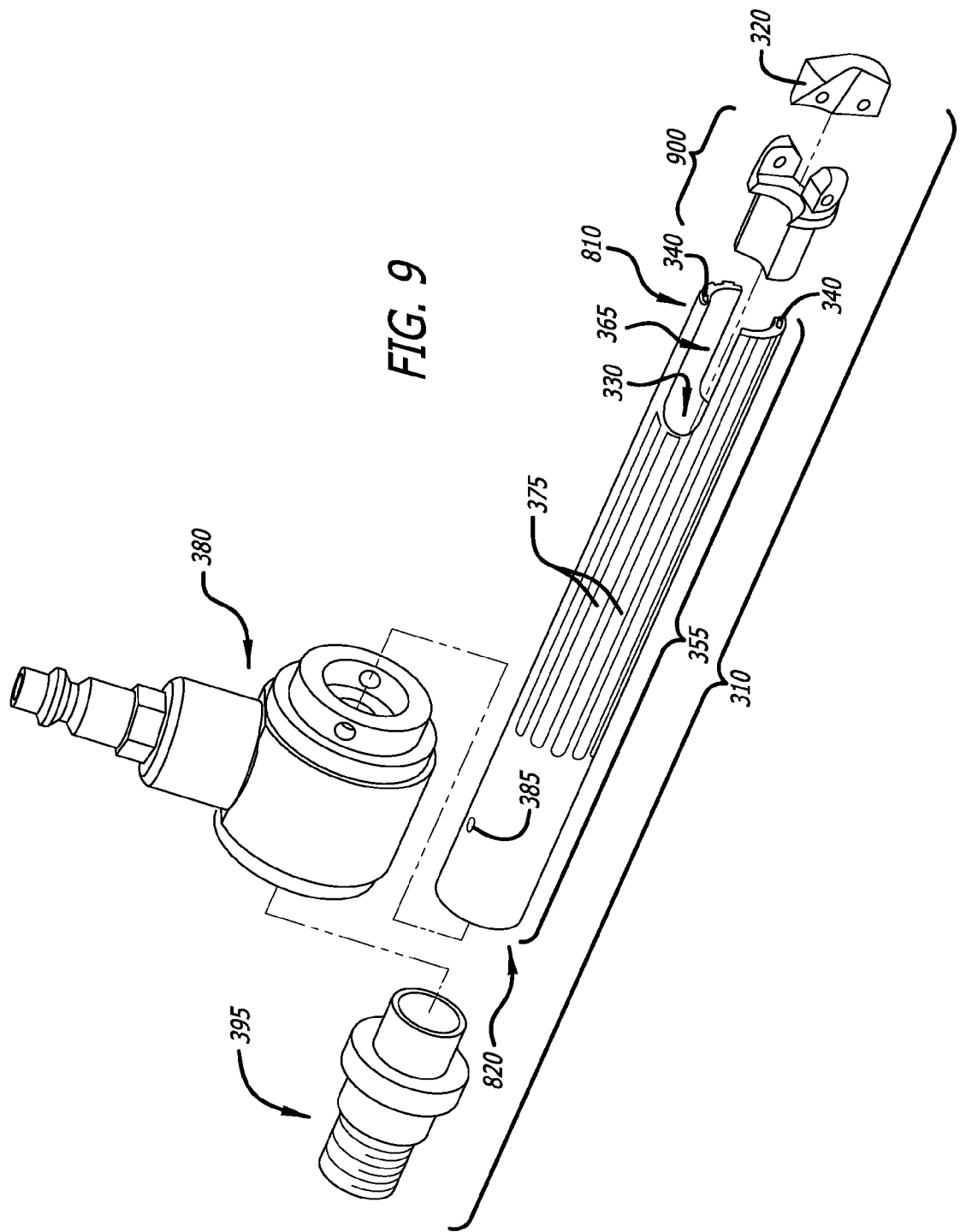
Figure 10:
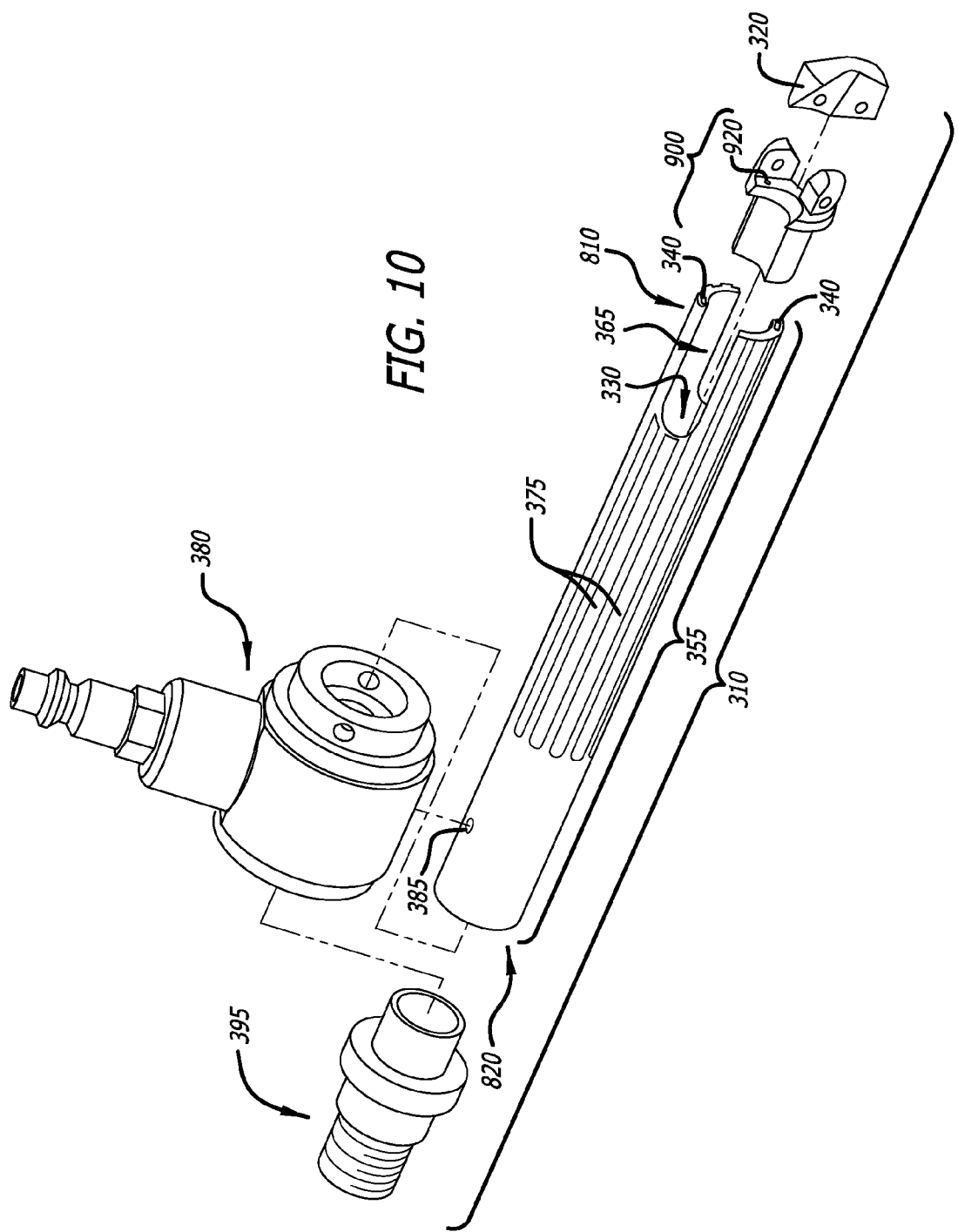
Figure 11:
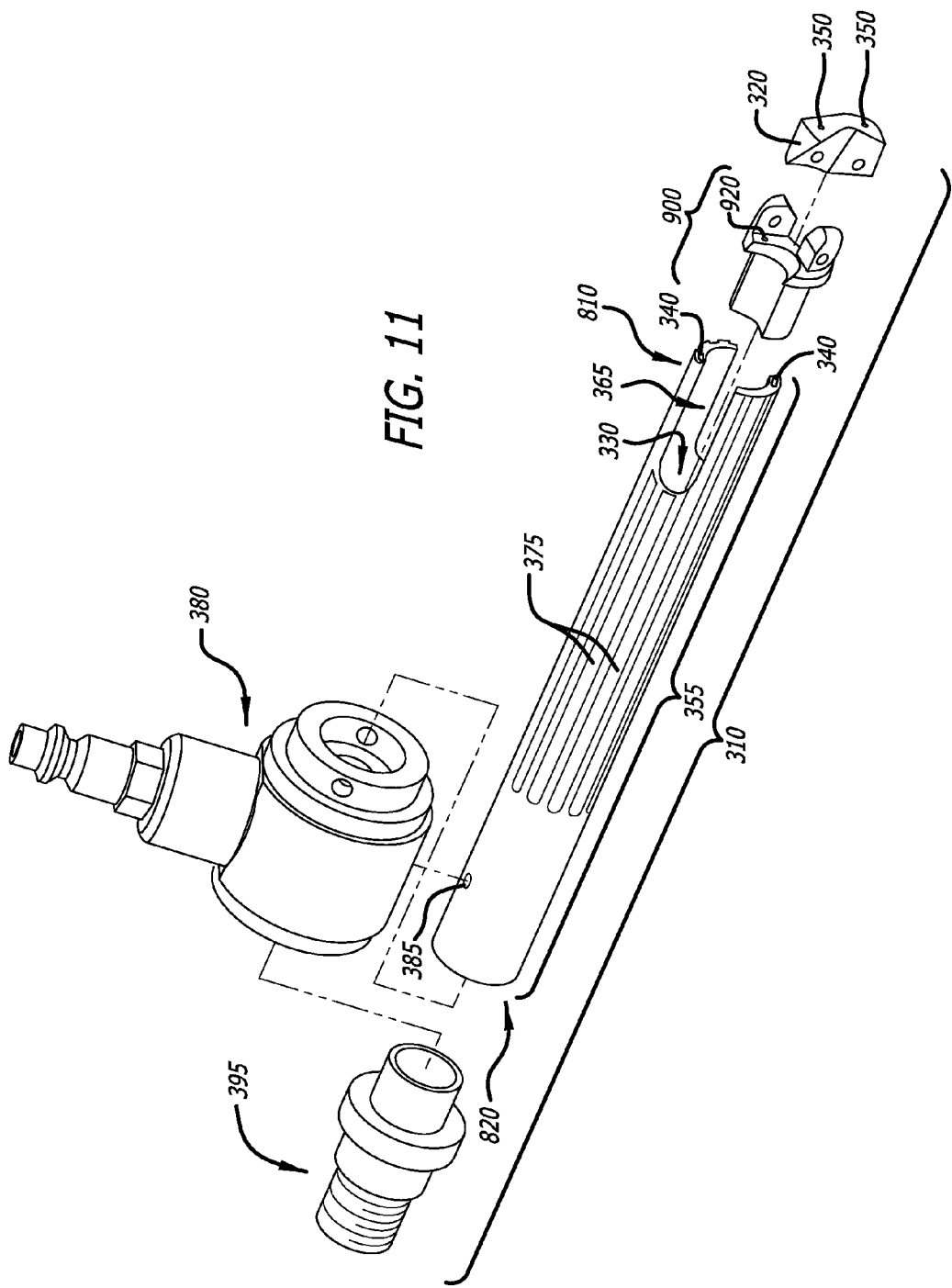

Having thus described examples of the disclosure in general terms, reference will now be made to the accompanying drawings, which are not necessarily drawn to scale, and wherein like reference characters designate the same or similar parts throughout the several views, and wherein:

FIG. 1 is a flow diagram of aircraft production and service methodology;

FIG. 2 is a block diagram of an aircraft;

FIG. 3A is a block diagram of a system, according to an aspect of the present disclosure;

FIG. 3B is a perspective view of an exemplary workpiece that may be processed by the disclosed system, according to an aspect of the present disclosure;

FIG. 4 is a schematic view of the system of FIG. 3A, according to an aspect of the present disclosure;

FIG. 5 is perspective view of the tool shown in FIG. 4, according to an aspect of the present disclosure;

FIG. 6 is a perspective sectional view of the tool of FIG. 3A, according to an aspect of the present disclosure;

FIG. 7 is perspective detail view of the reamer-type cutter and a portion of the tool of FIG. 5, according to an aspect of the present disclosure;

FIG. 8 is a perspective view of one example of a body of the tool of FIG. 3A, according to an aspect of the present disclosure;

FIG. 9 is an exploded perspective view of an example of the tool of FIG. 3A, according to an aspect of the present disclosure;

FIG. 10 is an exploded perspective view of another example of the tool of FIG. 3A, according to an aspect of the present disclosure;

FIG. 11 is an exploded perspective view of yet another example of the tool of FIG. 3A, according to an aspect of the present disclosure;

FIG. 12 is a schematic side elevation view of an example of the tool of FIG. 3A having a curved passage, according to an aspect of the present disclosure;

FIG. 13 is a schematic side elevation view of another example of the tool of FIG. 3A having a spiral passage, according to an aspect of the present disclosure;

FIG. 14A is a schematic side elevation view of yet another example of the tool of FIG. 3A having an annular passage, according to an aspect of the present disclosure; and FIG. 14B is a schematic cross-sectional view of the tool of FIG. 14A, according to an aspect of the present disclosure.

DETAILED DESCRIPTION

Examples of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft take place. Thereafter, the aircraft 102 may go through certification and delivery 112 to be placed in service 114. While in service by a customer, the aircraft 102 is scheduled for routine maintenance and service 116 (which may also include modification, reconfiguration, refurbishment, and so on).

Each of the processes of the illustrative method 100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 2, the aircraft 102 produced by the illustrative method 100 may include an airframe 118 with a plurality of high-level systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Apparatus and methods shown or described herein may be employed during any one or more of the stages of the manufacturing and service method 100. For example, components or subassemblies corresponding to component and subassembly manufacturing 108 may be fabricated or manufactured in a manner similar to components or subassemblies produced while the aircraft 102 is in service. Also, one or more aspects of the apparatus, method, or combination thereof may be utilized during the production states 108 and 110, for example, by substantially expediting assembly of or reducing the cost of an aircraft 102. Similarly, one or more of apparatus or method realizations, or a combination thereof, may be utilized, for example and without limitation, while the aircraft 102 is in service, e.g., maintenance and service 116.

As illustrated in FIGS. 3A and 3B, one example of the disclosure relates to a system 300 for processing a location 302 of a workpiece 301. The system includes a tool 310, including a first passage 330, configured to supply vacuum to the location 302, and a second passage 340, formed along the first passage 330, where the second passage 340 is configured to supply fluid to the location 302. The system also includes means 370 for rotating and selectively axially vibrating the tool 310, means 380 for supplying fluid to the tool 310, and means 390 for supplying vacuum to the tool 310.

Referring to FIG. 3B, the workpiece 301 may include any number of different materials including, but not limited to, metal, carbon fiber reinforced plastics (CFRP), and/or other materials. Metallic components of the workpiece 301 may include, but are not limited to, aluminum (Al), titanium (Ti), and stainless steel. In one example, the workpiece 301 may be manufactured to include any number of layers 303 of different materials stacked together. For example, layers 303a and 303c may be made of CFRP, and a layer 303b may be made of metal.

Referring once again to FIG. 3A, different types of drills may be employed as the means 370 for rotating and selectively axially vibrating the tool 310. Such drills may include, but are not limited to, micro-peck drills. Commercially available micro-peck drills that may be employed include, but are not limited to, Set-Tec ST1200, manufactured by Desoutter, Rock Hill, S.C.; Set-Tec ST2200, manufactured by Desoutter, Rock Hill, S.C.; and/or PFD1100, manufactured by Atlas Copco Tools Inc., Auburn Hills, Mich.

Moreover, different types of fluid sources may be employed as the means 380 for supplying fluid to the tool 310. For example, a fluid pump, such as a Typhoon pump, manufactured by Unist Inc., Grand Rapids, Mich., may be utilized as the means 380. Additionally, different types of vacuum sources may be employed as the means 390 for supplying vacuum to the tool 310. In one example, a Central Vacuum System vacuum source, manufactured by Spencer, Windsor, Conn., may be used as the means 390.

In FIG. 3A, lines connecting various elements and/or components of the system 300 may represent mechanical, electrical, fluid, optical, electromagnetic, and other couplings and/or combinations thereof. Couplings other than those depicted in FIG. 3A may also exist. Dashed lines connecting the various elements and/or components of the system 300 may represent couplings similar in function and purpose to those represented by solid lines; however, couplings represented by the dashed lines relate to alternative or optional aspects of the disclosure. Likewise, elements and/or components of the system 300 represented in dashed lines represent alternative or optional aspects of the disclosure.

Referring, e.g., to FIGS. 3A and 3B, one example of the disclosure relates to the tool 310 for processing the location 302 of the workpiece 301. The tool includes the first passage 330, configured to supply vacuum to the location 302, and the second passage 340, configured to supply fluid to the location 302. The second passage 340 is formed along the first passage 330, as shown, for example, in FIG. 6. According to one aspect of the disclosure, the first passage 330 has a first diameter, the second passage 340 has a second diameter, and a ratio of the second diameter to the first diameter is between about 0.03 and about 0.09. The second diameter of the second passage 340 is much smaller than the first diameter of the first passage 330 to ensure that the second passage 340 provides a controlled amount of fluid, sufficient to lubricate and cool the tool 310 and the location 302 of the workpiece 301 without supplying an excessive amount of fluid that would be difficult to remove. In one aspect, the first passage 330 may have a diameter of about 0.340 inches (8.6 mm). In another alternative, the diameter of the first passage 330 may be about 0.800 inches (20.3 mm). Those skilled in the art will appreciate that the first passage 330 and the second passage 340 may have a variety of different sizes.

In one aspect, referring to FIGS. 3A-7, the tool 310 also includes a cutter 320. In one aspect, the cutter 320 is removable from the tool 310. The cutter 320 may include a third passage 350 in communication with the second passage 340. In one aspect, the cutter 320 also includes a fourth passage 360 in communication with the first passage 330.

Different types of cutting tips may be employed as the cutter 320. For example, FIGS. 4-7 illustrate the cutter 320 as a reamer. Those skilled in the art will appreciate that a variety of reamers may be utilized. Referring to FIGS. 9-11, for example, a drill tip may also be employed as the cutter 320. Those skilled in the art will similarly appreciate that different types of drill tips may be utilized.

Turning, for instance, to FIGS. 3A, 6, and 8, in one aspect, the tool 310 also includes a body 355, including a proximal portion 820 and a distal portion 810 opposite the proximal portion 820. The first passage 330 and the second passage 340 are formed within the body 355. The first passage 330 and the second passage 340 extend between the proximal portion 820 and the distal portion 810. The body 355 includes at least one inlet 365 in the distal portion 810. The inlet(s) 365 is in communication with the first passage 330. The inlet(s) 365, as is shown, is axially oriented in the body 355. Alternatively, the inlet(s) 365 may be laterally oriented in the body 355. The body 355 includes at least one entry port 385 for communicating fluid therethrough from the means 380. The entry port(s) 385 is in the proximal portion 820. The entry port(s) 385 is in communication with the second passage 340. As is shown, the entry port(s) 385 is generally circular in shape, but those skilled in the art will appreciate that the port may have a different shape, as necessary.

Referring, for example, to FIGS. 3A, 9, 10, and 11, the tool 310 also may include an adapter 395 coupled to the proximal portion 820 of the body 355. In one aspect, referring to FIG. 9, the tool 310 may include an interface 900 coupled to the distal portion 810 of the body 355. The tool 310 may also include a cutter 320 removably coupled to the interface 900. The cutter 320 may be coupled to the interface 900 by various different means including, but not limited to, screws and fasteners (not shown).

In one aspect, referring to FIG. 10, the interface 900 may include a channel 920 that is in communication with the second passage 340 of the body 355. In one aspect, referring to FIG. 11, the cutter may include a third passage 350 that is in communication with the channel 920 in the interface 900. The channel 920 is also in communication with the second passage 340 of the body 355 and the third passage 350 is in communication with the second passage 340 via the channel 920 of the interface 900.

In one aspect, referring to FIG. 6, the second passage 340 is straight. Alternatively, the second passage 340 may be curved (refer to FIG. 12). In yet another aspect, the second passage 340 may be generally spiral, such as a helix (refer to FIG. 13). Also, at least a portion of the second passage 340 may be annular (refer to FIGS. 14A and 14B).

Referring to FIGS. 3B, 8, 9, 10, and 11, one example of the present disclosure relates to a method for manufacturing the tool 310 for processing a location 302 of the workpiece 301. The method includes extruding the body 355, including the proximal portion 820 and the distal portion 810 opposite the proximal portion 820; extruding the first passage 330 within the body 355; and extruding the second passage 340 within the body 355, where the second passage 340 is formed along the first passage 330. In one aspect, the method also includes brazing the adaptor 395 to the proximal portion 820 of the body 355. In one aspect, the method also includes brazing the interface 900, to the distal portion 810 of the body 355. As is shown, the body 355 is extruded to be generally cylindrical in shape. In addition, the method may include machining the body 355 to have at least one flute 375.

One example of the present disclosure relates to a method of processing the location 302 of the workpiece 301. The method includes advancing the tool 310 into the workpiece 301 while rotating and selectively axially vibrating the tool 310; selectively supplying a fluid through the tool 310 to the location 302; and evacuating, through the tool 310, processing debris and the fluid from the location 302. Evacuating the processing debris includes supplying a vacuum through the tool 310 to the location 302. The fluid is supplied through the tool 310 to the location 302 under a pressure. In one aspect, the pressure may be between approximately 30 pounds per square inch (PSI) and approximately 120 PSI.

In one aspect, the method also includes advancing the tool 310 into a layer of the workpiece 301 made of a non-metallic material. In one aspect, advancing the tool 310 into the non-metallic layer also includes avoiding supplying the fluid to the location 302. In one aspect, advancing the tool 310 into the non-metallic layer also includes avoiding axially vibrating the tool 310.

One example of the present disclosure relates to a method of processing the location 302 of the workpiece 301, where the workpiece 301 includes the layer R and the layer Ω. The method includes advancing the tool 310 into the layer R at a first feed rate while rotating the tool 310 at a first rotational speed and selectively axially vibrating the tool 310 at a first frequency and a first amplitude; advancing the tool 310 into the layer Ω at a second feed rate while rotating the tool 310 at a second rotational speed and selectively axially vibrating the tool 310 at a second frequency and a second amplitude; selectively supplying a fluid through the tool 310 to the location 302; and evacuating, through the tool 310, processing debris and the fluid from the location 302.

In one aspect, the layer R is made of a non-metallic material and the layer Ω is made of a metallic material. With the layer R made of a non-metallic material and the layer Ω made of a metallic material, the first rotational speed may be greater than the second rotational speed and advancing the tool 310 into the layer R may include avoiding supplying the fluid to the location 302. In one aspect, advancing the tool 310 into the non-metallic layer R also includes avoiding axially vibrating the tool.

In one aspect, the first rotational speed of the tool 310, as it is advanced into the layer R, is equal to the second rotational speed of the tool, as it is advanced into the layer Ω. Alternatively, the first rotational speed may be greater than the second rotational speed. In another aspect, the first rotational speed may be less than the second rotational speed. For example, a maximum rotational speed may be approximately 1000 revolutions per minute (RPM).

In one aspect, the first frequency of vibration of the tool 310, as it is advanced into the layer R, is equal to the second frequency of vibration of the tool, as it is advanced into the layer Ω. Alternatively, the first frequency may be greater than the second frequency. In another aspect, the first frequency may be less than the second frequency. As an example, the tool 310 may have a frequency of vibration of about three to seven cycles per revolution of the tool 310.

In one aspect, the first feed rate of the tool 310, as it is advanced into the layer R, is equal to the second feed rate of the tool, as it is advanced into the layer Ω. Alternatively, the first feed rate may be greater than the second feed rate. In another aspect, the first feed rate may be less than the second feed rate. For example, a maximum feed rate may be approximately 0.006 inches per revolution (approximately 0.1524 millimeters per revolution).

In one aspect, the first amplitude of vibration of the tool 310, as it is advanced into the layer R, is equal to the second amplitude of vibration of the tool, as it is advanced into the layer Ω. Alternatively, the first amplitude may be greater than the second amplitude. In another aspect, the first amplitude may be less than the second amplitude. As an example, the tool 310 may be axially vibrated at an amplitude between approximately 0.10 millimeters (mm) and approximately 0.30 mm.

Different examples and aspects of the apparatus and methods are disclosed herein that include a variety of components, features, and functionality. It should be understood that the various examples and aspects of the apparatus and methods disclosed herein may include any of the other components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A tool for processing a location of a workpiece, the tool comprising:
   a body comprising:
      a first passage formed within the body and configured to supply a vacuum to the location,
      a second passage formed within the body and configured to supply a fluid to the location, wherein the second passage is formed along the first passage,
      a proximal portion and a distal portion opposite the proximal portion, wherein the first passage and the second passage extend between the proximal portion and the distal portion, and
      at least one inlet in the distal portion, wherein the at least one inlet is in communication with the first passage, and wherein the at least one inlet is laterally oriented in the body; and
   a cutter removably coupled to the distal portion of the body,
   wherein the cutter comprises a third passage in communication with the second passage, and
   wherein the cutter comprises a fourth passage in communication with the first passage.

2. The tool of claim 1, further comprising an interface coupled to the distal portion of the body.

3. The tool of claim 2, wherein the interface comprises a channel in communication with the second passage.

4. The tool of claim 2, wherein the third passage is in communication with a channel in the interface.

5. The tool of claim 4, wherein the channel is in communication with the second passage.

6. The tool of claim 1, wherein the first passage has a first diameter, the second passage has a second diameter, and a ratio of the second diameter to the first diameter is between about 0.03 and about 0.09.

7. The tool of claim 1, wherein the second passage is straight.

8. The tool of claim 1, wherein the second passage is curved.

9. The tool of claim 1, wherein the second passage is generally spiral.

10. The tool of claim 1, wherein at least a portion of the second passage is annular.

11. The tool of claim 1, wherein the body comprises at least one entry port.

12. The tool of claim 11, wherein the at least one entry port is in the proximal portion, wherein the at least one entry port is in communication with the second passage.

13. The tool of claim 1, further comprising an adapter coupled to the proximal portion of the body.

14. A method of processing a location of a workpiece, the method comprising:
   advancing a tool into the workpiece while rotating and selectively axially vibrating the tool;
   selectively supplying a fluid through the tool to the location when the tool is advanced into a metallic layer of the workpiece;
   evacuating, through the tool, processing debris and the fluid from the location when the tool is advanced into the metallic layer of the workpiece;
   avoiding supplying the fluid through the tool to the location when the tool is advanced into a non-metallic layer of the workpiece; and
   evacuating, through the tool, processing debris from the location when the tool is advanced into the non-metallic layer of the workpiece,
   wherein the tool comprises:
      a body comprising:
         a first passage formed within the body and configured to supply a vacuum to the location, a second passage formed within the body and configured to supply the fluid to the location, and a cutter comprising:
a third passage in communication with the second passage, and
a fourth passage in communication with the first passage, wherein the fluid is supplied from the second passage into the third passage, and the debris flows from the fourth passage into the first passage.

15. The method of claim 14, wherein evacuating the processing debris includes supplying the vacuum through the tool to the location.

16. The method of claim 14, wherein the fluid is supplied through the tool to the location under a pressure.

17. A method of processing a location of a workpiece, the workpiece comprising a layer R and a layer $\Omega$, the method comprising:
advancing a tool into the layer R at a first feed rate while rotating the tool at a first rotational speed and selectively axially vibrating the tool at a first frequency and a first amplitude;
advancing the tool into the layer $\Omega$ at a second feed rate while rotating the tool at a second rotational speed and selectively axially vibrating the tool at a second frequency and a second amplitude;
selectively supplying a fluid through the tool to the location; and
evacuating, through the tool, processing debris and the fluid from the location,
wherein the tool comprises:
a body comprising:
a first passage formed within the body and configured to supply a vacuum to the location,
a second passage formed within the body and configured to supply the fluid to the location, and
a cutter comprising:
a third passage in communication with the second passage, and
a fourth passage in communication with the first passage, wherein the fluid is supplied from the second passage into the third passage, and the debris flows from the fourth passage into the first passage.

18. The method of claim 17, wherein the layer R is made of a non-metallic material and the layer $\Omega$ is made of a metallic material.

19. The method of claim 18, wherein advancing the tool into the layer R further comprises avoiding supplying the fluid to the location.

20. The method of claim 18, wherein the first rotational speed is greater than the second rotational speed.

* * * * *